(12) United States Patent
Wunderlich et al.

(10) Patent No.: US 12,139,211 B2
(45) Date of Patent: Nov. 12, 2024

(54) METHOD FOR OPERATING A STEERING SYSTEM

(71) Applicant: Robert Bosch GmbH, Stuttgart (DE)

(72) Inventors: Carsten Wunderlich, Schorndorf (DE); Christian Guenther, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 17/791,439

(22) PCT Filed: Nov. 18, 2020

(86) PCT No.: PCT/EP2020/082460
§ 371 (c)(1),
(2) Date: Jul. 7, 2022

(87) PCT Pub. No.: WO2021/148162
PCT Pub. Date: Jul. 29, 2021

(65) Prior Publication Data
US 2023/0064903 A1 Mar. 2, 2023

(30) Foreign Application Priority Data
Jan. 24, 2020 (DE) ...................... 10 2020 200 861.2

(51) Int. Cl.
*B62D 5/04* (2006.01)
*B62D 6/00* (2006.01)
*B62D 15/02* (2006.01)

(52) U.S. Cl.
CPC .......... *B62D 5/0457* (2013.01); *B62D 6/002* (2013.01); *B62D 15/0245* (2013.01)

(58) Field of Classification Search
CPC .... B62D 5/0457; B62D 5/0493; B62D 6/002; B62D 15/0245
See application file for complete search history.

(56) References Cited

U.S. PATENT DOCUMENTS

| 4,739,855 A | * | 4/1988 | Miyoshi | B62D 5/008 180/422 |
|---|---|---|---|---|
| 2003/0146038 A1 | * | 8/2003 | Mills | B62D 5/001 180/422 |

(Continued)

FOREIGN PATENT DOCUMENTS

| CN | 102015415 A | 4/2011 |
|---|---|---|
| CN | 106274552 A | 1/2017 |

(Continued)

OTHER PUBLICATIONS

International Search Report corresponding to PCT Application No. PCT/EP2020/082460, mailed Feb. 15, 2021 (German and English language document) (5 pages).

Primary Examiner — George C Jin
(74) Attorney, Agent, or Firm — Maginot, Moore & Beck LLP

(57) ABSTRACT

The disclosure relates to a method for operating a steer-by-wire steering system which includes at least one steering input element, at least one steering actuating element operatively connected to the steering input element, at least one first end stop for mechanically limiting a movement of the steering actuating element in a first direction of movement and at least one second end stop for mechanically limiting a movement of the steering actuating element in a second direction of movement, wherein a steering ratio between the steering input element and the steering actuating element is adapted such that a maximum deflection of the steering input element in a first steering direction, in which the steering actuating element reaches the first end stop, and a maximum deflection of the steering input element in a second steering direction, in which the steering actuating element reaches the second end stop, are at least substantially identical.

10 Claims, 3 Drawing Sheets

(56) References Cited

U.S. PATENT DOCUMENTS

| | | | |
|---|---|---|---|
| 2003/0196849 A1* | 10/2003 | Menjak | B62D 5/008 |
| | | | 180/446 |
| 2006/0131096 A1* | 6/2006 | Ono | B62D 5/008 |
| | | | 180/400 |
| 2013/0124043 A1 | 5/2013 | Degenstein | |
| 2016/0221601 A1 | 8/2016 | Barthomeuf et al. | |
| 2016/0236706 A1 | 8/2016 | Mitsui | |
| 2018/0304923 A1* | 10/2018 | Kilz | B62D 6/002 |
| 2019/0367079 A1* | 12/2019 | Kodera | B62D 6/002 |
| 2020/0023898 A1* | 1/2020 | Hosono | B62D 5/0466 |
| 2020/0307674 A1* | 10/2020 | Morino | B62D 15/021 |
| 2021/0024122 A1* | 1/2021 | Walentowski | B62D 1/16 |
| 2023/0234637 A1* | 7/2023 | Miyakawa | B62D 6/00 |
| | | | 180/402 |
| 2024/0025473 A1* | 1/2024 | Koudai | B62D 5/0481 |

FOREIGN PATENT DOCUMENTS

| | | |
|---|---|---|
| DE | 103 05 132 A1 | 11/2004 |
| DE | 10 2006 043 069 A1 | 3/2008 |
| DE | 10 2008 055 900 A1 | 6/2009 |
| DE | 10 2008 040 202 A1 | 1/2010 |
| DE | 10 2008 048 523 A1 | 3/2010 |
| DE | 10 2011 105 064 A1 | 12/2012 |
| DE | 10 2011 116 456 A1 | 4/2013 |
| DE | 10 2011 122 772 A1 | 5/2013 |
| DE | 10 2018 115 329 A1 | 1/2020 |
| EP | 0 842 080 B1 | 5/1998 |
| JP | H6-72344 A | 3/1994 |
| JP | H11-43066 A | 2/1999 |
| JP | 2002-337711 A | 11/2002 |

* cited by examiner

METHOD FOR OPERATING A STEERING SYSTEM

This application is a 35 U.S.C. § 371 National Stage Application of PCT/EP2020/082460, filed on Nov. 18, 2020, which claims the benefit of priority to Serial No. DE 10 2020 200 861.2, filed on Jan. 24, 2020 in Germany, the disclosures of which are incorporated herein by reference in their entirety.

BACKGROUND

The disclosure relates to a method for operating a steering system. Moreover, the disclosure relates to a control apparatus having a computer unit for carrying out such a method, to a steering system having a computer unit for carrying out such a method, as well as to a vehicle having such a steering system.

Known from the prior art are vehicles which comprise a conventional steering system having a steering input element, for example in the form of a steering wheel, a wheel steering angle actuator in the form of a steering gear, and a steering column for mechanically connecting the steering input element to the wheel steering angle actuator. Moreover known are vehicles having steer-by-wire steering systems which dispense with any direct mechanical connection between a steering input element and steered vehicle wheels and in which a steering command at the steering input element is transmitted exclusively in an electrical manner. Said steer-by-wire steering systems here typically comprise a steering input unit as well as at least one mechanical wheel steering angle actuator that is mechanically separated from the steering input unit. In both cases, the wheel steering angle actuator furthermore comprises a steering actuation element, for example in the form of a rack, as well as two mechanical terminal detents for delimiting a movement of the steering actuation element. For reasons relating to manufacturing, the vehicle however does not inevitably travel in a straight line when the steering actuation element is situated in a central position. This leads to a maximum movement of the steering actuation element and consequently a maximum deflection of the steering input element, proceeding from a neutral position, in which the vehicle travels in a straight line, potentially being different in both steering directions.

Proceeding therefrom, the object of the disclosure lies in particular in providing a system having improved properties in terms of a steering and/or driving behavior. The object is achieved by the features of claims 1, 8, 9 and 10, while advantageous design embodiments and refinements of the disclosure can be derived from the dependent claims.

SUMMARY

Proposed is a method for operating a steering system, in particular a steer-by-wire steering system, wherein the steering system comprises at least one steering input element, at least one steering actuation element that is operatively connected to the steering input element, at least one first terminal detent for mechanically delimiting a movement of the steering actuation element in a first movement direction, and at least one second terminal detent for mechanically delimiting a movement of the steering actuation element in a second movement direction, the latter being in particular counter to the first movement direction, and wherein a steering ratio between the steering input element and the steering actuation element is adapted in such a manner that a maximum deflection of the steering input element in a first steering direction, in particular proceeding from a neutral position of the steering input element, in which the steering actuation element reaches the first terminal detent, and a maximum deflection of the steering input element in a second steering direction, in particular proceeding from the neutral position of the steering input element, in which the steering actuation element reaches the second terminal detent, are at least substantially identical. The steering ratio is in particularly adapted in such a manner that a maximum steering movement range of the steering input element in the first steering direction, and a maximum steering movement range of the steering input element in the second steering direction, are at least substantially identical, wherein a respective maximum steering movement range is in particular defined and/or delimited by a respective maximum deflection of the steering input element and the neutral position. In particular, the steering ratio in this way is variable and is advantageously varied and/or modified as a function of the steering direction of the steering input element. Moreover, a deflection and/or movement of the steering input element in the first steering direction, in particular a deflection and/or movement of the steering actuation element in the first movement direction and a deflection and/or movement of the steering input element in the second steering direction, causes a deflection and/or movement of the steering actuation element in the second movement direction. As a result of this design embodiment, a steering and/or driving behavior can in particular be improved, wherein a driving comfort can in particular be enhanced. In particular, a potential offset of the steering actuation element from a central position herein can be equalized and/or compensated and an identical maximum deflection of the steering input element in both steering directions can thus be achieved even in the event of the steering actuation element not being in the central position while the vehicle drives straight ahead.

The steering system comprises in particular at least one computer unit which is provided for carrying out the method for operating the steering system. Moreover, the steering system can comprise further components and/or modules such as, for example, at least one steering input unit which comprises in particular the steering input element, at least one wheel steering angle actuator which is advantageously mechanically separated from the steering input unit and comprises in particular the steering actuation element, the first terminal detent and/or the second terminal detent, and/or at least one control apparatus which is in particular provided for electrically coupling the steering input unit and the wheel steering angle actuator, and in particular the steering input element and the steering actuation element. A "wheel steering angle actuator" in this context is to be understood to mean in particular a unit which is connected to at least one vehicle wheel of the vehicle and by changing a wheel steering angle of at least one vehicle wheel is provided for transmitting a steering command, in particular of a driver and in particular on the steering input element, to the vehicle wheel and, as a result, for advantageously controlling at least one alignment of the vehicle wheel and/or influencing a driving direction of the vehicle. To this end, the wheel steering angle actuator advantageously comprises at least one steering actuation element, for example in the form of a rack, and at least one steering actuator, for example in the form of an electric motor, that is operatively connected to the steering actuation element. The wheel steering angle actuator is furthermore preferably configured as a central actuator and assigned to at least two, in particular steerable vehicle wheels that are preferably configured as front wheels. A "computer unit" is to be understood to mean in particular an electric and/or electronic unit which has an information input, and information processing unit, and an information output. Furthermore advantageously, the computer unit has at least one processor, at least one operating memory, at least one input and/or output means, at least one operating program, at least one open-loop control routine, at least one closed-loop control routine, at least one computing routine and/or at least one evaluating routine. The computer unit is in particular provided at least for adapting a steering ratio between the steering input element and the steering actuation element, particularly in such a manner that a maximum deflection of the steering input element in the first steering direction and a maximum deflection of the steering input element in the second steering direction are at least substantially identical. The computer unit here is preferably integrated in the control apparatus of the steering system. "Provided" here is to be understood to mean in particular specially programmed, conceived and/or equipped. An object being provided for a specific function is to be understood to mean in particular that the object fulfils and/or carries out this specific function in at least one state of application and/or operation. Furthermore, the term "at least substantially identical" is to be understood to mean in particular identical with the exception of production tolerances and/or within the scope of production-related possibilities and/or within the scope of standardized tolerances. The steering ratio between the steering input element and the steering actuation element is particularly preferably adapted in such a manner that the maximum deflection of the steering input element in the first steering direction and the maximum deflection of the steering input element in the second steering direction are identical.

For adapting the steering ratio as a function of a deflection of the steering input element, a target position of the steering actuation element is preferably determined and preferably computed, as a result of which an advantageously simple control algorithm can be provided in particular. The target position of the steering actuation element here can in particular be supplied to a closed-loop control unit of the steering system, said closed-loop control unit being integrated in the control apparatus and/or in the computer unit, for example, and being in particular provided for controlling in a closed-loop a position of the steering actuation element and for moving and/or adjusting the steering actuation element advantageously interacting with the steering actuator.

According to one particularly preferred design embodiment it is proposed that, when determining the target position of the steering actuation element, at least one steering-direction-dependent correction factor is taken into account. The correction factor here advantageously has two different values for the two steering directions, as a result of which particularly flexible adapting of the steering ratio as a function of the steering direction can be achieved in particular.

The two different values here can in particular be variable and, proceeding from the neutral position, have a linear, an exponential and/or a logarithmic profile, for example. However, it is preferably proposed that the correction factor for the first steering direction has a fixed first value, and for the second steering direction has a fixed second value, as a result of which a computation algorithm can in particular be simplified. The correction factor is thus preferably fixed and is initially applied once for the two steering directions.

A particularly simple application of the correction factor here can in particular be achieved when the correction factor for the first steering direction has a first value which is determined from a ratio between a maximum deflection of the steering input element in the first steering direction in which the steering actuation element reaches and/or would reach in particular the first terminal detent, without adapting the steering ratio, and half a total deflection of the steering input element in both steering directions, and for the second steering direction has a second value which is determined from a ratio between a maximum deflection of the steering input element in the second steering direction in which the steering actuation element reaches and/or would reach in particular the second terminal detent, without adapting the steering ratio, and half the total deflection of the steering input element in both steering directions.

According to one further design embodiment it is proposed that, when determining the target position of the steering actuation element, at least one, in particular manufacturing-related and/or production-related, offset between a center and/or center point of the steering actuation element and a central position is taken into account. A "central position" is to be understood to mean in particular a position of the steering actuation element in which, in particular proceeding from the neutral position, a first movement distance at which the steering actuation element reaches the first terminal detent, and a second movement distance at which the steering actuation element reaches the second terminal detent, are identical. A correction of the straight-ahead travel can advantageously be achieved by taking into account the offset.

It is furthermore proposed that, when determining the target position of the steering actuation element, at least one actuator ratio of the steering system, in particular between the steering actuation element and a steering actuator, in particular the steering actuator already mentioned above, for adjusting the steering actuation element is taken into account. The actuator ratio here can in particular be fixed and advantageously correspond to a mechanical ratio of the wheel steering angle actuator. Alternatively, the actuator ratio can in particular also be variable and advantageously be adapted automatically or manually, for example by means of a switch, depending on the driving situation. A particularly exact determination of the steering ratio can in particular be achieved as a result.

The method for operating the steering system as well as the steering system here are not to be limited to the application and the embodiment described above. In particular, the method for operating the steering system and the steering system for fulfilling a function described herein may have a number of individual elements, components and units deviating from the number mentioned herein.

BRIEF DESCRIPTION OF THE DRAWINGS

Further advantages are derived from the following description of the drawings. An exemplary embodiment of the disclosure is illustrated in the drawings in which.

DETAILED DESCRIPTION

Figure 1A:
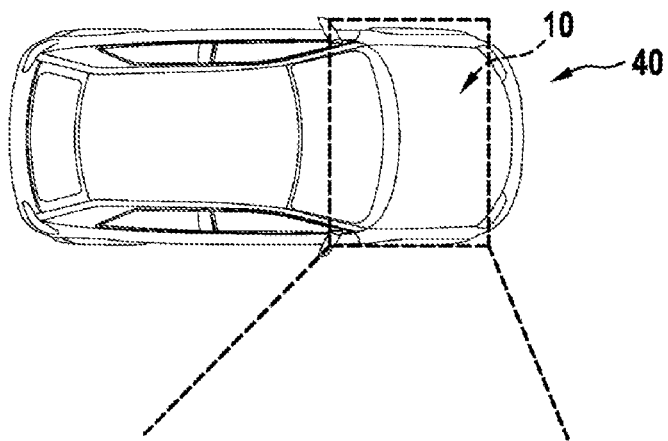
FIGS. 1a-b show a vehicle having a steering system configured as a steer-by-wire steering system in a simplified illustration.
Figure 1B:
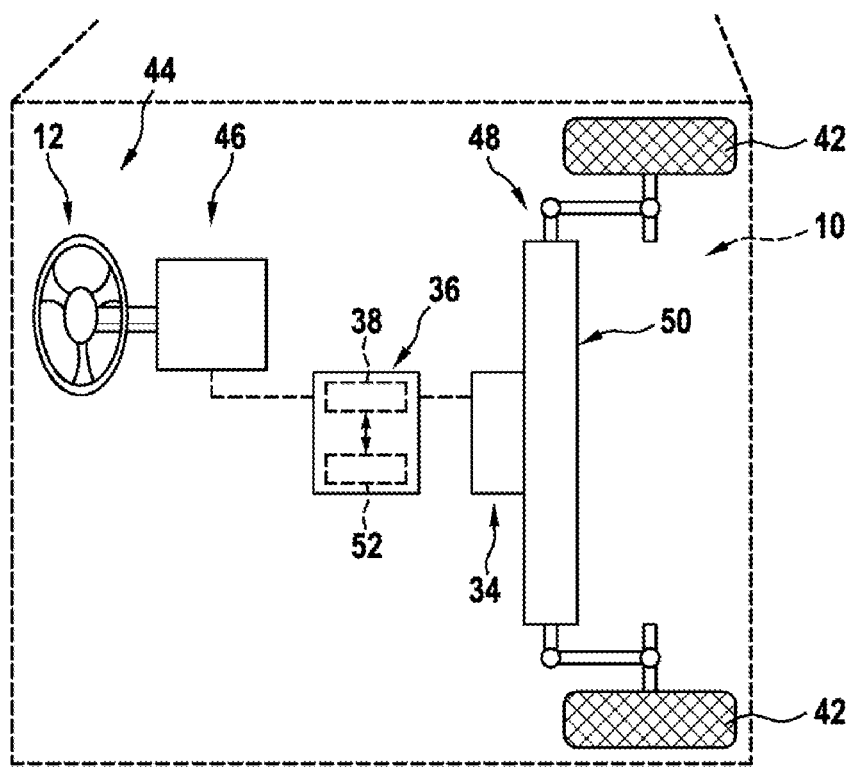

FIGS. 1a and 1b show a vehicle 40 which, configured as a passenger motor vehicle, for example, has a plurality of vehicle wheels 42 and has a steering system 10 in a simplified illustration. The steering system 10 has an operative connection to the vehicle wheels 42 and is provided for influencing a driving direction of the vehicle 40. The steering system 10 in the present case is furthermore configured as a steer-by-wire steering system in which a steering command in at least one operating state is transmitted to the vehicle wheels 42 exclusively in an electrical manner. In principle however, a steering system could also be configured as a superposition steering and/or active steering.

The steering system 10 comprises a steering input unit 44. The steering input unit 44 comprises a steering input element 12, for example in the form of a steering wheel. Moreover, the steering input unit 44 comprises a feedback actuator 46 which is, in particular mechanically, coupled to the steering input element 12. The feedback actuator 46 is provided for detecting, in particular directly, signals, forces and/or moments from the steering input element 12, and/or for transmitting, in particular directly, said signal, forces and/or moments to the steering input element 12. In the present case, the feedback actuator 46 is provided at least for generating a steering resistance and/or a restore moment on the steering input element 12. Alternatively, a steering input element may also be configured as a joystick, as a steering lever and/or as a steering ball, or the like. Furthermore, a feedback actuator could in principle also be dispensed with.

Moreover, the steering system 10 has a wheel steering angle actuator 48. The wheel steering angle actuator 48 is connected to the steering input unit 44 in a purely electrical manner. The wheel steering angle actuator 48 is configured as a central actuator. The wheel steering angle actuator 48 has an operative connection to at least two of the vehicle wheels 42, in particular two front wheels, and is provided for converting a steering command at the steering input element 12 into a steering movement of the vehicle wheels 42. In principle, a steering system may of course also comprise a plurality of wheel steering angle actuators, the latter being in particular configured as individual wheel actuators.

The wheel steering angle actuator 48 has a gearbox housing 50. The gearbox housing 50 is configured as an external housing. The gearbox housing 50 is provided for receiving and/or for mounting at least a large part of the components required for operating the wheel steering angle actuator 48.

Figure 2A:
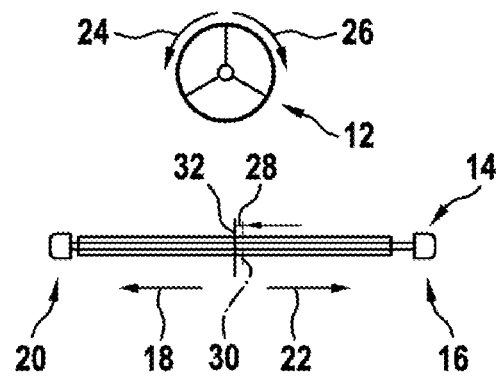
FIGS. 2a-c show a detailed illustration of part of the steering system in different operating states.
Figure 2B:
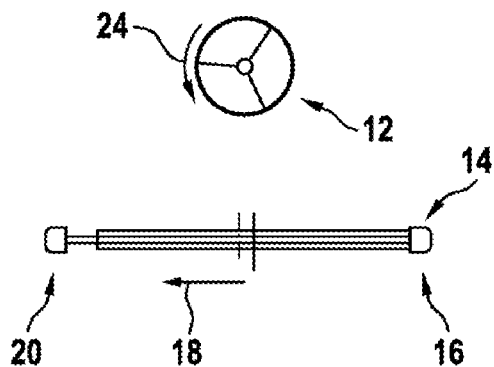
Figure 2C:
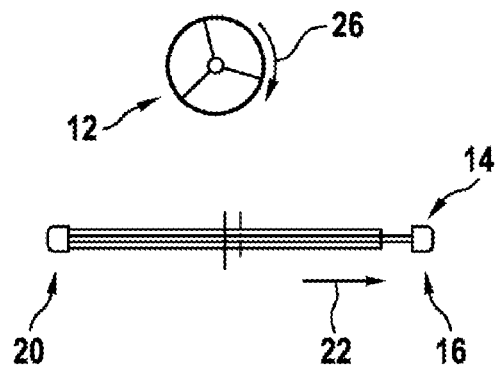

The wheel steering angle actuator 48 furthermore comprises a steering actuation element 14 (cf. in particular FIGS. 2a-c). The steering actuation element 14 is disposed in the gearbox housing 50 and mounted so as to be axially movable. the steering actuation element 14 in the present case is configured as a rack. The steering actuation element 14 is provided for, in particularly mechanically, adjusting a wheel steering angle of the vehicle wheels 42, configured in particular as front wheels. To this end, the steering actuation element 14 has an operative connection to the steering input element 12. Proceeding from a neutral position, illustrated in particular in FIG. 2a, a deflection and/or movement of the steering input element 12 in a first steering direction 24 causes a deflection and/or movement of the steering actuation element 14 in a first movement direction 18, and a deflection and/or movement of the steering input element 12 in a second steering direction 26 causes a deflection and/or movement of the steering actuation element 14 in a second movement direction 22.

The wheel steering angle actuator 48 moreover comprises two mechanical terminal detents 16, 20 mechanically delimiting a movement of the steering actuation element 14 (cf. in particular FIGS. 2a-c). The terminal detents 16, 20 are disposed in the gearbox housing 50. The terminal detents 16, 20 here are disposed on different, in particular mutually opposite, sides of the steering actuation element 14. A first terminal detent 16 of the terminal detents 16, 20 is provided for mechanically delimiting a movement of the steering actuation element 14 in the first movement direction 18 (cf. in particular FIG. 2b). The first terminal detent 16 here, proceeding from the neutral position, defines a maximum deflection of the steering input element 12 in the first steering direction 24, the latter being correlated in particular with the first movement direction 18. A second terminal detent 20 of the terminal detents 16, 20 is provided for mechanically delimiting a movement of the steering actuation element 14 in the second movement direction 22 (cf. in particular FIG. 2c). The second terminal detent 20 here, proceeding from the neutral position, defines a maximum deflection of the steering input element 12 in the second steering direction 28, the latter being correlated in particular with the second movement direction 22.

Moreover, the wheel steering angle actuator 48 comprises a steering actuator 34. The steering actuator 34 has an operative connection to the steering actuation element 14. The steering actuator 14 is configured as an electric motor, in the present case in particular as a permanently excited synchronous motor. The steering actuator 34 is electrically actuatable and provided for moving and/or adjusting the steering actuation element 14 as a function of the steering command.

Furthermore, the steering system 10 has a control apparatus 36. The control apparatus 36 is consequently configured as a steering control apparatus. The control apparatus 36 has an electrical connection to the wheel steering angle actuator 48. The control apparatus 36 furthermore has an electrical connection to the steering input unit 44. In this way, the control apparatus 36 couples the wheel steering angle actuator 48 and the steering input unit 44 to one another. The control apparatus 36 is provided for controlling an operation of the steering system 10. The control apparatus 36 is provided for actuating the steering actuator 34 as a function of a signal of the steering input unit 44, in particular as a function of a steering command at the steering input element 12. The control apparatus 36 is furthermore provided for actuating the feedback actuator 46 as a function of a signal of the wheel steering angle actuator 48.

To this end, the control apparatus 36 comprises a computer unit 38. The computer unit 38 comprises at least one processor (not illustrated), for example in the form of a microprocessor, and at least one operating memory (not illustrated). Moreover, the computer unit 38 comprises at least one operating program which is stored in the operating memory and has at least one open-loop control routine, at least one closed-loop control routine, at least one computing routine and at least one evaluating routine. In principle of course, a control apparatus could also be separate from a steering control apparatus and be configured, for example, as a central control apparatus of a vehicle.

Furthermore, the control apparatus 36 comprises a closed-loop control unit 52. The closed-control unit 52 is configured as a closed-loop steering control. The closed-loop control unit 52 has an operative connection to the computer unit 38. Moreover, the closed-loop control unit 52 has an operative connection to the steering actuator 34. The closed-loop control unit 52 is provided for actuating the steering actuator 34 and, by way of the latter, for closed-loop controlling a position of the steering actuation element 14. Alternatively, it is conceivable for a closed-loop control unit to be integrated directly in the computer unit and for a separate closed-loop control unit to be dispensed with.

In the production of the steering system 10, the steering system 10 now is typically adjusted in such a manner that the vehicle 40 drives straight ahead and the steering input element 12 herein is situated in the neutral position thereof. However, by virtue of manufacturing tolerances, the steering actuation element 14 in this case is not inevitably situated in a central position 32 so that an offset 28 between a center 30 of the steering actuation element 14 and the central position 32 exists. Proceeding from the neutral position, this leads to a maximum movement of the steering actuation element 14 in the two movement directions 18, 22, and consequently a maximum deflection of the steering input element 12 in the two steering directions 24, 26, being different (cf. in particular FIG. 2a).

In order to equalize and/or compensate for this offset 28, an exemplary method for operating the steering system 10 will be explained hereunder. It is exploited here that a steering ratio between the steering input element 12 and the steering actuation element 14 in the steering system 10, configured as a steer-by-wire steering system, is variable and thus can be freely modified. The same applies in an analogous manner fundamentally also to other steering systems which permit a variably adjustable steering ratio, such as in the case of a superposition steering and/or active steering, for example. In the present case, the computer unit 38 is in particular provided for carrying out the method and to this end has in particular a computer program having a corresponding program code means.

In the present case, the steering ratio between the steering input element 12 and the steering actuation element 14 is varied and/or modified as a function of the steering direction 24, 26 of the steering input element 12. The steering ratio between the steering input element 12 and the steering actuation element 14 here is adapted in such a manner that a maximum deflection of the steering input element 12 in the first steering direction 24, in which the steering actuation element 14 reaches the first terminal detent 16, and a maximum deflection of the steering input element 12 in a second steering direction 26, in which the steering actuation element 14 reaches the second terminal detent 20, are at least substantially identical. By adapting the steering ratio, this, proceeding from the neutral position, results in a maximum steering movement range of the steering input element 12 in the first steering direction 24, and a maximum steering movement range of the steering input element 12 in the second steering direction 26, said maximum steering movement ranges being at least substantially identical such that an identical maximum deflection of the steering input element 12 in both steering directions 24, 26 can be achieved even in the case of the steering actuation element 14 not being in the central position 32 when the vehicle 40 travels straight ahead. In this way, in the present exemplary embodiment, when steering to the right a steering ratio which differs from that when steering to the left is chosen and/or adjusted, as a result of which a symmetrical arrangement of the terminal detents 16, 20 can be achieved.

In order for the steering ratio to be adapted, a target position of the steering actuation element 14 is determined as a function of the deflection of the steering input element 12, and supplied in particular to the closed-loop control unit 52 so as to control the position of the steering actuation element 14 in a closed loop.

When determining the target position of the steering actuation element 14, at least one steering-direction-dependent correction factor is taken into account here, the latter in the present case having a fixed first value for the first steering direction 24 and a fixed second value, deviating from the first value, for the second steering direction 26. The first value here results from a ratio between a maximum deflection of the steering input element 12 in the first steering direction 24, without adapting the steering ratio, and half a total deflection of the steering input element 12 in both steering directions 24, 26. The second value is determined in a manner analogous to that of the first value. In this way, the second value results from a ratio between a maximum deflection of the steering input element 12 in the second steering direction 26, without adapting the steering ratio, and half the total deflection of the steering input element 12 in both steering directions 24, 26.

Moreover, the offset 28, which is in particular related to manufacturing and/or production, between the center 30 of the steering actuation element 14 and the central position 32 can be taken into account when determining the target position of the steering actuation element 14.

Furthermore, an actuator ratio of the steering system 10, in particular between the steering actuation element 14 and the steering actuator 34, can be taken into account when determining the target position of the steering actuation element 14. The actuator ratio in the present case here is fixed, and corresponds in particular to a ratio in the mechanism of the wheel steering angle actuator 48. Alternatively however, an actuator ratio may also be variable, and be advantageously adapted automatically or manually, for example by means of a switch, depending on the driving situation.

In the present case, the target position of the steering actuation element 14 in an exemplary manner results by means of the following correlation:

$$L = LW \cdot X + \text{Offset} \cdot j = \begin{cases} LW \cdot x1 + \text{Offset} \cdot j & \text{for } LW > 0 \\ LW \cdot x2 + \text{Offset} \cdot j & \text{for } LW < 0 \end{cases}$$

L here describes the target position of the steering actuation element 14, LW describes the deflection of the steering input element 12, X describes the steering-direction-dependent correction factor, x1 describes the first value of the steering-direction-dependent correction factor, x2 describes the second value of the steering-direction-dependent correction factor, Offset describes the offset 28 between the center 30 of the steering actuation element 14 and the central position 32, and j describes the actuator ratio.

In a purely exemplary manner, and using the following values
 Offset: Offset=15° (=2.66 mm)
 Target terminal detent: LW=±450° (=±80 mm)
 Correction factor: x1)=(−450°+15°/−450°=435/450
  x2=)(450°+15°/450°=465/450
 Actuator ratio: j=80 mm/450°
for the straight-ahead travel
 LW=0
 L=0.465/450+15°·0.80 mm/450°=2.67 mm
and for the terminal detent positions:
 LW=450° or 80 mm, respectively
 L=80 mm 435/450+15°·0.80 mm/450°=80 mm
 LW=−450° or −80 mm, respectively
 L+−80 mm 465/450+15°.80 mm/450°=−80 mm As a result thereof, a maximum deflection of the steering input element 12, in the present example in particular in the form of a maximum steering angle, in the first steering direction 24, in which the steering actuation element 14 reaches the first terminal detent 16, and a maximum deflection of the steering input element 12, in the present example in particular in the form of a maximum steering angle, in a second steering direction 26, in which the steering actuation element 14 reaches the second terminal detent 20, are at least substantially identical.

Figure 3:
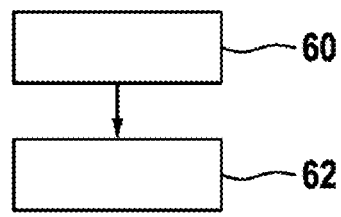
FIG. 3 shows an exemplary flowchart having primary method steps of a method for operating the steering system.

FIG. 3 finally shows an exemplary flowchart having primary method steps of the method for operating the steering system 10.

In a first method step 60, for adapting the steering ratio as a function of a deflection of the steering input element 12, a target position of the steering actuation element 14 is determined, advantageously while taking into account the steering-direction-dependent correction factor, the offset 28 between the center 30 of the steering actuation element 14 and the central position 32 and/or the actuator ratio.

In a subsequent second method step 62, the target position can then be supplied to the closed-loop control unit 52 which for moving and/or adjusting the steering actuation element 14 interacts with the steering actuator 34.

The exemplary flowchart in FIG. 3 here is intended to describe a method for operating the steering system 10 particularly in a merely exemplary manner. Individual method steps may in particular also vary, or additional method steps may be added, such as an additional directional stability correction.

The invention claimed is:

1. A method for operating a steering system, which is configured as a steer-by-wire steering system, wherein the steering system comprises at least one steering input element, at least one steering actuation element that is operatively connected to the at least one steering input element, at least one first terminal detent configured to mechanically delimit a movement of the at least one steering actuation element in a first movement direction, and at least one second terminal detent configured to mechanically delimit a movement of the at least one steering actuation element in a second movement direction, comprising:
adapting a steering ratio between the at least one steering input element and the at least one steering actuation element such that a maximum deflection of the at least one steering input element in a first steering direction in which the at least one steering actuation element reaches the at least one first terminal detent, and a maximum deflection of the at least one steering input element in a second steering direction in which the at least one steering actuation element reaches the at least one second terminal detent, are at least substantially identical.

2. The method as claimed in claim 1, wherein, adapting the steering ratio comprises:
determining a target position of the at least one steering actuation element.

3. The method as claimed in claim 2, wherein, determining the target position of the at least one steering actuation element comprises:
determining the target position using at least one steering-direction-dependent correction factor.

4. The method as claimed in claim 3, wherein the at least one steering-direction-dependent correction factor comprises:
a first correction factor for the first steering direction, the first correction factor having a fixed first value; and
a second correction factor for the second steering direction, the second correction factor having a fixed second value.

5. The method as claimed in claim 3, wherein:
a correction factor for the first steering direction has a first value which is determined from a ratio between a maximum deflection of the at least one steering input element in the first steering direction, without adapting the steering ratio, and half a total deflection of the at least one steering input element in both steering directions, and
a correction factor for the second steering direction has a second value which is determined from a ratio between a maximum deflection of the at least one steering input element in the second steering direction, without adapting the steering ratio, and half the total deflection of the at least one steering input element in both steering directions.

6. The method as claimed in claim 2, wherein, when determining the target position of the at least one steering actuation element, a manufacturing-related and/or a production-related offset between a center of the steering actuation element and a central position is taken into account.

7. The method as claimed in claim 2, wherein determining the target position of the steering actuation element comprises:
determining the target position of the at least one steering actuation element based upon at least one actuator ratio of the steering system between the at least one steering actuation element and a steering actuator configured to adjust the at least one steering actuation element.

8. The method of claim 1, wherein a control apparatus includes at least one computer unit configured to perform the method.

9. A steering system, comprising:
at least one steering input element;
at least one steering actuation element operatively connected to the at least one steering input element;
at least one first terminal detent configured to mechanically delimit a movement of the at least one steering actuation element in a first movement direction;
at least one second terminal detent configured to mechanically delimit a movement of the at least one steering actuation element in a second movement direction; and
a computer unit configured to adapt a steering ratio between the at least one steering input element and the at least one steering actuation element such that a maximum deflection of the at least one steering input element in a first steering direction in which the at least one steering actuation element reaches the first terminal detent, and a maximum deflection of the at least one steering input element in a second steering direction in which the at least one steering actuation element reaches the second terminal detent, are at least substantially identical.

10. A vehicle having a steering system, comprising:
at least one steering input element;
at least one steering actuation element operatively connected to the at least one steering input element;
at least one first terminal detent configured to mechanically delimit a movement of the at least one steering actuation element in a first movement direction;
at least one second terminal detent configured to mechanically delimit a movement of the at least one steering actuation element in a second movement direction; and
a computer unit configured to adapt a steering ratio between the at least one steering input element and the at least one steering actuation element such that a maximum deflection of the at least one steering input element in a first steering direction in which the at least one steering actuation element reaches the first terminal detent, and a maximum deflection of the at least one steering input element in a second steering direction in which the at least one steering actuation element reaches the second terminal detent, are at least substantially identical.

\* \* \* \* \*